Aug. 11, 1959     E. E. TURNER     2,899,565
METHOD AND APPARATUS FOR ENERGY CONVERSION
Filed Feb. 7, 1957     3 Sheets-Sheet 1

INVENTOR.
EDWIN E. TURNER
BY
Martin J. Finnegan
ATTORNEY

Aug. 11, 1959     E. E. TURNER     2,899,565
METHOD AND APPARATUS FOR ENERGY CONVERSION
Filed Feb. 7, 1957     3 Sheets-Sheet 2
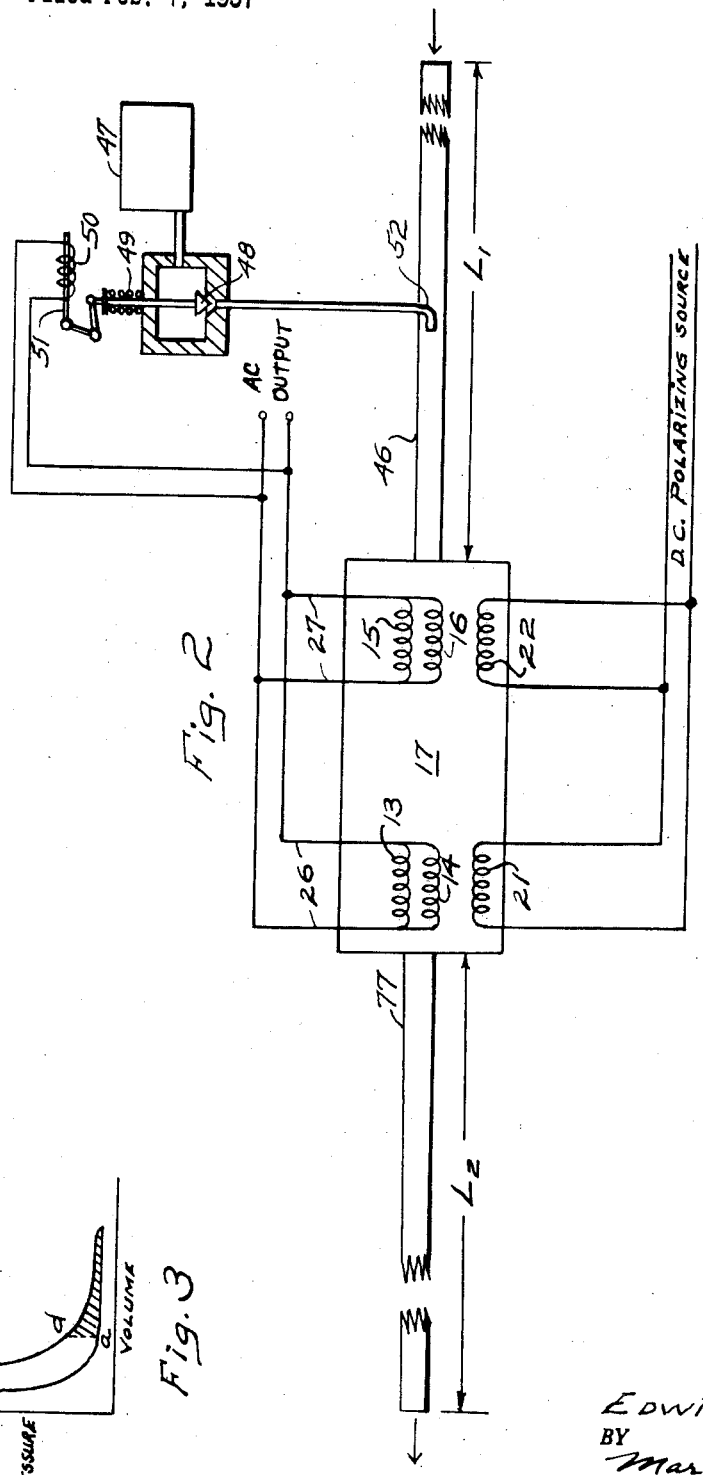
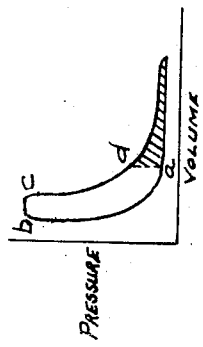
INVENTOR.
EDWIN E. TURNER
BY Martin J. Finnegan
ATTORNEY

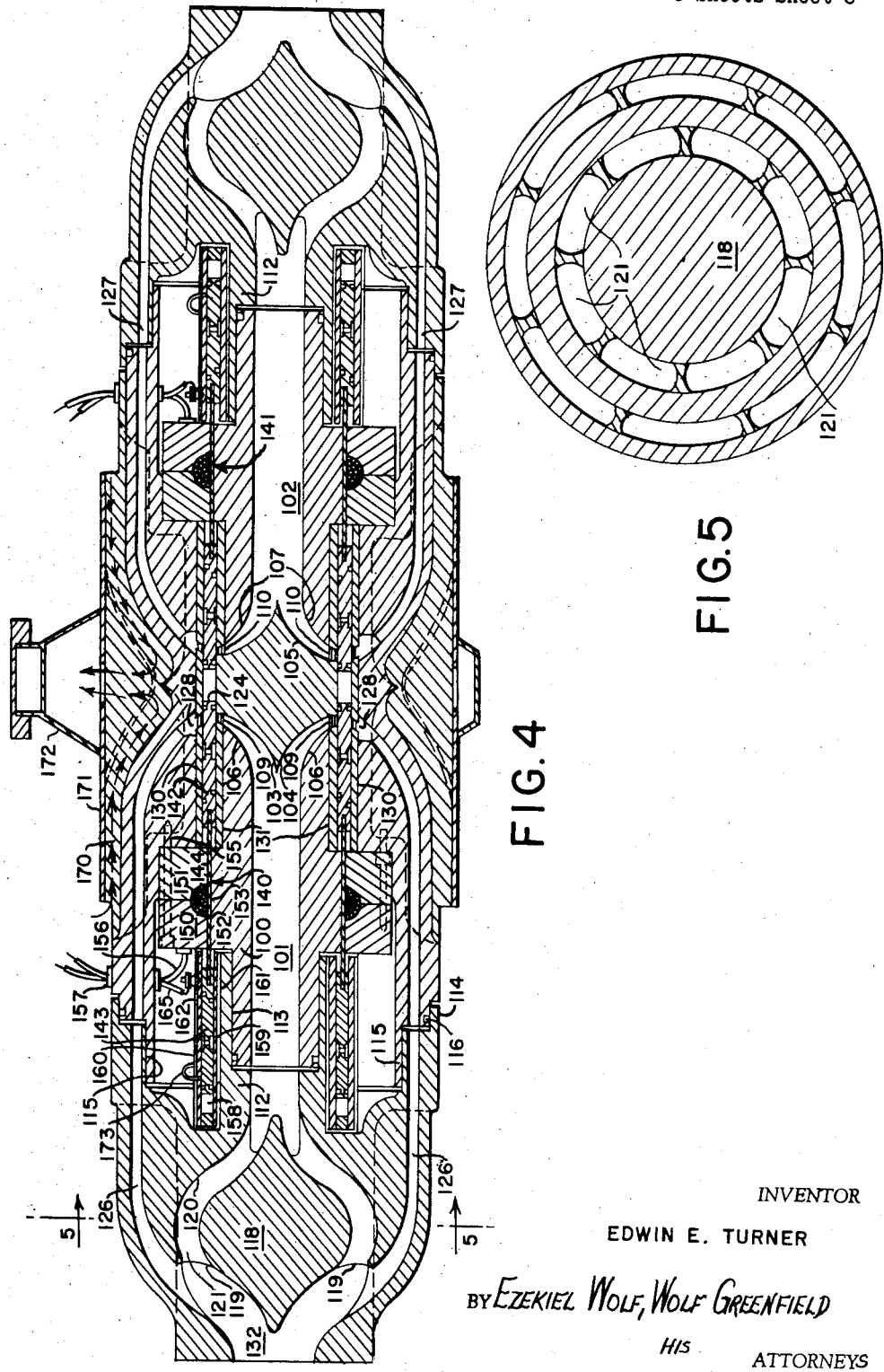

United States Patent Office 2,899,565
Patented Aug. 11, 1959

2,899,565

METHOD AND APPARATUS FOR ENERGY CONVERSION

Edwin E. Turner, West Roxbury, Mass.

Application February 7, 1957, Serial No. 638,883

27 Claims. (Cl. 290—1)

This invention relates to the conversion of potential energy in fuel to electrical energy in the output of an alternating current power supply, and particularly to the generation of electric power by the utilization of the kinetic and potential energies developed in a heat engine of the free piston internal combustion type, integral with a vibratory longitudinal A.C. generator. This is a continuation in part of my co-pending application, Serial No. 453,311, filed August 31, 1954 and now abandoned.

An object of the invention is to produce an engine having only two principal moving parts. A further object of the invention is to control combustion in the engine in a manner that will maintain the thermal efficiency at a substantially constant high level, over wide ranges of load. In this connection, the invention contemplates continual fluctuation in the energy distribution between kinetic and potential energy, but in such a manner that the transfer from one form to the other occurs smoothly and without loss of power. This is accomplished by so choosing the mass of the moving parts, their amplitude and frequency of vibration, that the storage of kinetic energy in the moving parts at maximum velocity and the storage of potential energy in the gas at maximum displacement of the moving parts are each twenty times, more or less, the energy lost internally and extracted from the electrical generator per radian period at full load.

The particular advantage of this method is found in the ability of the device to integrate out the perturbations due to the individual explosions by means of the inertia of the moving parts, so that the time of the explosion and the speed of burning of the fuel are not required to be exact functions of the physical position of the pistons with respect to dead center, as is the case with the usual crank and piston engine. As a result, high ratios of compressions and/or expansion may be employed, with high thermal efficiency, but without degenerative effects from pre-ignition.

In furtherance of this concept, of loss-less interchange of kinetic and potential energy, augmented at random times by the addition of heat energy, the invention provides a method of energy conversion embracing the steps of (1) permitting the degree of compression (accompanied by adiabatic temperature rise) of the operating fluid to control the point in the compression stroke where ignition occurs, (2) permitting the working components of the engine to reverse at will, in response to the sum of the pressures due to the converted kinetic energy of the moving pistons, appearing as potential energy in the compressed gas together with the pressure due to the heat of combustion, without regard to the physical position of the pistons, so that the working components tend to maintain their cyclical vibrations at a constant maximum displacement amplitude and velocity, and to generate as a consequence, a constant maximum peak pressure (3) causing the electrical output voltage to be directly proportional to said constant vibratory velocity and (4) causing the fuel intake per cycle to be controlled by said electrical output voltage and/or load current, thus assuring that the mechanical amplitude and frequency of vibration and the electrical output voltage and frequency will remain substantially constant with varying load.

As one means of reducing the above outlined method of operation to practice, I propose to embody the invention in a power plant of the free piston internal combustion type, with compression ignition of a fuel-air mixture introduced into the annular area between the aligned edges of free running pistons, before compression begins, which pistons are of a mass just sufficient to have, at their maximum velocity, kinetic energy storage twenty times, more or less, the energy lost internally and extracted from the electrical generator per radian period at full load, said pistons being of annular form and made of electrically conducting material, to permit their serving the additional function as moving conductors in the vibratory longitudinal alternating current generator, which is the electrical power source.

It is known that the thermal efficiency of an internal combustion engine depends upon its compression ratio and its expansion ratio when the two are not equal, and that in general, higher efficiency is obtained at higher compression-expansion ratios. It is also a fact that for most efficient thermo-dynamic cycles, the ratio of maximum to mean effective pressure is high, so that very high compression ratios and/or expansion ratios above certain limiting values are not to be desired. An excessively high compression ratio results in the temperature of the working fluid reaching such a high value due to the effects of adiabatic compression alone that it is not possible to add sufficient heat to the gas at constant volume without extreme maximum pressures and temperatures. This can best be done at constant pressure. But the addition of heat at constant pressure results in an expansion ratio less than the compression ratio, and thereby lowers the thermodynamic efficiency. There is, therefore, for a given engine, a most desirable compression and expansion ratio and a most desirable ratio of mean effective to peak pressure which will cause the engine to have the highest output combined with the highest thermodynamic and overall efficiency at full load and to maintain that efficiency, best at smaller and larger loads.

It is proposed to show that the optimum ratio of mean effective to peak pressure in a free piston engine at full load is $$\frac{\pi}{2\,Q_L}$$

where $Q_L$ is the ratio of mass reactance of the individual moving pistons to the mechanical loss resistance against which they work, that the modulus value of $Q_L$, for the engine at full load should be $$Q_L = \frac{\pi}{2} \frac{K-1(r-1)}{\left(\frac{(1)}{(r)}\right)^{K-1}(1-B^K)+K(B-1)}$$

where $r$ is the compression ratio, which is the ratio of the uncompressed to the compressed gas volume in the combustion chamber before combustion takes place and B is the so-called cut-off ratio and that further the ratio of the maximum temperature in the combustion chamber to the temperature induced by adiabatic compression alone should be B, where $$B^K = \frac{(2)^{\frac{-K}{K-1}}}{(K+1)}$$

at full load, resulting in an exhaust pressure just equal to critical throat pressure at the instant of opening of the exhaust ports, thus contributing the maximum velocity impulse to the exhaust gases, with minimum rejected heat energy, to excite most efficiently the resonant exhaust and intake ducts which comprise the scavenging means in the proposed engine. K is the ratio of the specific heats for constant pressure and constant volume for the fluid used.

Since the amplitude of vibration and the velocity of the piston are substantially constant and independent of load, it is clear that the peak pressure attained during each cycle may be kept substantially constant regardless of lead when $Q_L$ is high. This is true since the total peak force on each piston due to its own motion and without regard to the force of the explosion may be shown to be $$F = \gamma \omega^2 M$$

where F is the force in dynes $\omega = 2\pi_T$ and M is the mass of a single piston in grams. $f$ is the frequency in cycles per second, $\gamma$ is the displacement in centimeters. This force is large compared to the force of the explosion. To attain the value of force F the mass of each piston must be $$M = \frac{R}{4f} \times \frac{(K-1)(f-1)}{\left(\frac{(1)}{(r)}\right)^{K-1}(1-B^K) + K(B-1)}$$

where R is the mechanical load resistance in ohms. which the piston encounters and B is the cut off ratio, $f$ is the frequency in cycles per second, M is the mass in grams, $r$ is the compression ratio and K is the ratio of the specific heats.

Thus in the constant pressure cycle, whereas the peak pressure is always the same regardless of load, the mean effective pressure varies with load. The mean effective pressure is controlled by the amount of fuel admitted per stroke by the voltage controlled fuel inlet valve and is just sufficient to supply the output load and internal losses. Thus, at full load, the design value of $Q_L$ and the compression ratio $r$ are attained by selection of the mass of the pistons and their velocity at substantially fixed amplitude to accommodate the mechanical resistance to motion which the load represents. The value of the expansion ratio is set by the cut-off ratio B which, in turn is determined by regulation of the fuel admitted per stroke. Under full load conditions the mean effective pressure attains its maximum value as compared with the mean effective pressure for any value of load less than full load, that is to say, without overload.

As the electrical load on the generator is decreased, the mechanical Q of the system increases, the mean effective pressure decreases, and the fuel admitted per stroke is reduced. These design parameters insure maximum efficiency of the system at full load if the so-called "no-load" $Q_u$ of the mechanical system is high, that is to say, the frictional loss resistance at "no-load" is low. It has been determined that the so-called "no-load" $Q_u$ should be as large as possible, but at least ten times the full load $Q_L$ and that the full load $Q_L$ should be numerically equal to $$Q_L = \frac{\pi}{2} \frac{(K-1)(r-1)}{\left(\frac{(1)}{(r)}\right)^{K-1}(1-B)^K + K(B-1)}$$

to effect this desideratum.

Since the potential energy in the compressed gases as a result of the absorption of the kinetic energy due to the vibratory velocity of the pistons alone under these circumstances is twenty times or more the energy extracted from the electrical generator and lost internally at full load, per radian period, it is clear that by the principle of the conservation of momentum the pistons will reach their maximum displacement when the designed peak pressure is attained, with little regard to the instant at which the explosion occurs. That is to say, if the explosion occurs before the pistons have attained their designed displacement amplitude, inertia will carry them forward, in spite of the explosion, until all of the kinetic energy in the pistons is converted into potential energy in the gas. This energy is not dissipated but is returned to the pistons as kinetic energy on the reverse stroke. Thus, with a high mechanical Q in the moving parts of the engine and with pistons without elastic restraint save by the reversible forces of gas under pressure, a free and loss-less interchange of kinetic and potential energy transpires which makes possible high compression ratios and high thermal efficiency without prejudice from pre-ignition. This integration is a direct result of the selection of the proper mass and velocity of the pistons as described to secure the optimum loaded $Q_L$ and the optimum ratio of peak to mean effective pressure for the chosen mechanical load resistance.

As the load on the engine is decreased, by the abstraction of less electrical power from the generator, the amplitude of vibration, the peak pressure, the velocity of the pistons, the output voltage and frequency remain constant, but the mean effective pressure, the fuel injected per stroke, the electrical current delivered are reduced and the mechanical Q increases.

In the limit the mean effective pressure is reduced to a value just sufficient to supply the frictional and no-load heat losses represented by the so-called "no-load" $Q_u$, there is no useful output and the fuel admitted per stroke is at a minimum. Under these conditions the engine is operating up and down substantially the same adiabatic for the compression and expansion strokes, and is analogous to a pendulum oscillating freely with minimum losses and no useful output.

Thus the indicator diagram for the engine approximates nearly a single adiabatic for the no-load condition and a pair of adiabatics separated from each other along the volume coordinate for the full load diagram, a constant pressure cycle with mean effective pressure adjusted to load, constant stroke and constant maximum pressure.

A free piston engine designed in accordance with these criteria will have the highest efficiency at full load for a given ratio of compression, will maintain that efficiency for loads higher and lower than full load over the widest range, and will have an exhaust pressure equal to critical throat pressure at full load for most efficient thermodynamic excitation of the resonant intake and exhaust system which it is proposed to use for scavenging.

These criteria are $$Q_L = \frac{\omega M}{R}$$

$$Q_L = \left[\frac{\pi}{2} \frac{(K-1)(r-1)}{\left(\frac{(1)}{(r)}\right)^{K-1}(1-B^K) + K(B-1)}\right]$$

$$B^K \left(\frac{(2)}{(K+1)}\right)^{\frac{-K}{K-1}}$$

$$MEP = P_o(r)^K \cdot \frac{\pi}{2Q_L}; \quad Q_u \geq 10 Q_L$$

$$M = \frac{R}{4f} \left[\frac{(K-1)(r-1)}{\left(\frac{(1)}{(r)}\right)^{K-1}(1-B)^K + K(B-1)}\right]$$

$f$ equals frequency in cycles.
R is the mechanical load resistance in mechanical ohms.
$Q_u$ is the unloaded Q or ratio of mass reactance to resistance to motion unloaded.
$Q_L$ is the loaded Q, or ratio of mass reactance to resistance to motion loaded $\omega = 2\pi f$ and $$\text{one radian period} = \frac{1}{2\pi f}$$

$r$ is the compression ratio.
M is the mass of moving pistons in grams.
B is the so-called cut-off ratio. It is the ratio of the volume of the gas after combustion but before expansion to the volume of the gas before combustion but after compression. It is also the ratio of the absolute temperature of the gas after combustion but before expansion to the absolute temperature after compression but before combustion.

$P_o$ is the ambient pressure absolute in pounds per square inch.

K is the ratio of the specific heats at constant pressure to constant volume. This has the value of 1.4 for air.

Thermodynamically the operation of the engine will be defined by the following parameters. Figure 3 illustrates the cycles employed. If $r$ equals compression ratio equals volume at $a$ divided by volume at $b$.

$B$ equals cut-off ratio equals volume at $c$ divided by volume at $b$.

$Q_L$ equals loaded $Q$ equals ratio of mass reactance of moving piston to resistance to motion.

$$Q_L = \frac{\omega m}{R_1} = \frac{2\pi f m}{R_1}$$

Where $P_1$ equals mechanical ohms resistance at full load.
$M$ equals mass in grams.
$f$ equals frequency in cycles.
$Q_u$ equals unloaded $Q$.

$$Q_u = \frac{\omega m}{R_2} = \frac{2\pi f m}{R_2}$$

$R_2$ equals mechanical ohms resistance at no load.
$M$ equals mass in grams.
$F$ equals frequency in cycles.

Then if, $P_o$ equals ambient pressure in pounds/square inch absolute.
$T_o$ equals ambient temperature in degrees Fahrenheit absolute.
$K$ equals $C_p/C_v$ equals ratio of the specific heats for constant pressure and constant volume equals 1.4 for air.
(1) $P_a$ equals $P_o$
(2) $P_b$ equals $P_o (r) K$
(3) $P_c$ equals $P_o (r) K$
(4) $P_d$ equals $P_o B^K$
(5) $T_a$ equals $T_o$
(6) $T_b$ equals $T_o (r)^{K-1}{}_B$
(7) $T_c$ equals $T_o (r)^{K-1}{}_B$ $$\text{Thermal Eff} = 1 \left(\frac{(1)}{(r)}\right)^{K-1} \frac{B^K - 1}{K(B-1)}$$

$$\text{Mechanical Eff} = \frac{Q_u - Q_L}{Q_u}$$

$$\text{Generator Eff} = G$$

$$\text{Overall Eff} = \left(1 - \left(\frac{(1)}{(r)}\right)^{K-1}\right)\left(\frac{B^K - 1}{K(B-1)}\right)\frac{Q_u - Q_L}{Q_u} = G$$

$$MEP = P_o (r)^K \frac{\pi}{2Q_L}$$

$$B^K = \left(\frac{(2)}{K+1}\right)^{\frac{-K}{K-1}} = 1.895 \text{ for air at N.T.P.}$$

$B = 1.58$ for air at N.T.P.

R, the mechanical load resistance in mechanical ohms, against which the pistons work, is determined in the following way:

$$\text{Watts mechanical output} = 0.5 \overline{\gamma \omega}^2 R \times 10^{-7}$$

where $\omega$ is the amplitude of the piston in centimeters (one quarter of the total distance between the ends of the annular pistons at their widest separation.) $\omega = 2\pi f$, $f$ equals frequency in cycles per second and $\gamma \omega$ is the maximum velocity of the pistons in centimeters per second The value of peak force generated with amplitude $\gamma$ and mass M grams where M is the mass and $\gamma$ the amplitude of one piston is;

$$F \text{ max dynes} = \gamma \overline{\omega}^2 M$$

converted to pounds this force should be equal to;

$$P_o A (r) K$$

where $P_o$ is ambient pressure absolute in pounds per square inch, A is the end area of one piston in square inches, $r$ is the compression ratio and K is the ratio of the specific heats for constant pressure and volume.

The value of force doing work against the resistance R is:

$$F \text{ work dynes} = \gamma \omega R$$

where $\gamma$ is the amplitude of one piston and R is the resistance to motion. This value of force converted to pounds multiplied by $\pi/2$ and divided by the end area of one piston in square inches A is equal to the mean effective pressure, in pounds per square inch.

$$M.E.P. = \frac{\pi}{2} \frac{F \text{ work dynes} \times 2.248 \times 10^{-6}}{A}$$

When using the mean effective pressure to calculate the work done, the entire excursion of the two pistons namely, $4\gamma$ should be used as the stroke.

The value of $Q_L$ is:

$$Q_L = \frac{F \text{ max dynes}}{F \text{ work dynes}} = \frac{\gamma \overline{\omega}^2 m}{\gamma m R} = \frac{WM}{R}$$

For optimum design $Q_L$ should also equal $$Q_L = \frac{\pi}{2} \frac{(K-1)(r-1)}{\left(\frac{(1)}{(r)}\right)^{K-1}(1-B^K) + K(B-1)}$$

These criteria can be satisfied by selection of the proper mass and end area for the pistons, their amplitude and frequency of vibration and the load resistance R into which they work, the cutoff ratio being established by control of the fuel admitted per stroke.

A typical design might have the following characteristics:

$Q_L$ equals 22.75.
$r$ equals 20.8.
$B^K$ equals 1.895.
$B$ equals 1.58.
$P_a$ equals $P_o$ equals 14.7 pounds/square inch.
$P_b$ equals 1030 pounds/square inch.
$P_c$ equals 1030 pounds/square inch.
$P_d$ equals 27.85 pounds/square inch.
$T_a$ equals $T_o$ equals 530° F. absolute.
$T_b$ equals 1783° F. absolute.
$T_o$ equals 2815° F. absolute.
$T_d$ equals 1004° F. absolute.
$Q_u$ equals 10 $Q_L$ equals 227.5.
MEP equals 71 pounds/square inch.
Thermal efficiency equals 67.2%.
Mechanical efficiency equals 90%.
Generator efficiency equals 86%.
Overall efficiency equals 52%.
B.t.u./pound air heat absorbed equals 245.
B.t.u./pound air heat utilized equals 164.8.
B.t.u./pound air heat rejected equals 80.2.
Overall performance; 6450 B.t.u./kilowatt hour.

Scavenging the engine is accomplished in the following manner. The exhaust pressure is made to be equal to critical throat pressure at the exhaust ports just as they open, by adjusting the fuel admitted per stroke for full load, so that the cut-off ratio previously defined, is $B$ where $$B^K = \left(\frac{2}{K+1}\right)^{\frac{-K}{K-1}}$$

The heat energy rejected at the exhaust is used to eject the products of combustion out of the exhaust substantially at the velocity of sound for the conditions of temperature and pressure then existing.

To aid in the exhaust, the exhaust duct from the openings 71 Figure 1 outward is made to have a length $L_2$ 77 Figure 2, such that the wave of compression travelling to the left out of 45 in Figure 1 will be met, at the instant of opening of the exhaust port by a wave of rarefaction travelling to the right, at the exhaust ports, which wave was the wave of compression of the previous stroke, having in the meantime travelled up the exhaust duct for a suitable distance, having suffered a phase reversal upon reaching the end of the exhaust tube 77 and having returned as a wave of rarefaction to the starting point, in the time interval between the first opening of the exhaust ports and the next subsequent opening.

Since the engine operates at constant frequency, this length of duct is easily selected according to the method shown by Kadenacy in Patent No. 2,102,559.

In the scavenging process, air is admitted to the combustion chamber slightly after the opening of the exhaust ports, by the opening of the inlet ports 61. Input pressure at the input ports is obtained automatically by resonance in the intake duct as with the exhaust duct, except that in this instance a wave of compression will start travelling to the left at 61, following the exhausting products of combustion. This will be accompanied by a wave of rarefaction travelling to the right up the intake duct 46 Figure 2 of such length $L_1$ that the wave will reach its end, suffer a phase reversal, becoming a wave of compression and return as such to ports 61 just as they are opening for the second time. Thus effective scavenging will be obtained by a drop in pressure below atmospheric at the exhaust ports and a rise in pressure over atmosphere at the intake ports simultaneously and in time sequence with the opening of the respective ports.

In this way efficient replacement of the products of combustion with a fresh cool charge of air and fuel will take place without accessory apparatus, such as a pump. The only power utilized to accomplish this result is the waste heat energy rejected at the exhaust, which must be thrown away in any case. Since this rejected heat energy is utilized to scavenge the engine by acoustic resonance in the intake and exhaust ducts, the usual power loss associated with the scavenging pumps is eliminated.

Thus, the reversible adiabatic expansion stroke is carried through the complete toe of the thermodynamic cycle, shown shaded in Figure 3, to ambient pressure and temperature and the heat energy in the toe is made to perform the useful work of scavenging which would otherwise have to be supplied from the remainder of the thermodynamic cycle. In this way the constant pressure cycle is used to its utmost advantage and the overall efficiency kept at a value fixed by thermodynamic considerations in the cycle alone, without degeneration by the extraction of scavenging power from the useful output. By designing the cut-off ratio B at full load such that $$B^K = \left(\frac{(2)}{(K+1)}\right)^{\frac{-K}{K-1}}$$

the above result is most efficiently secured with the minimum expenditure of heat in the toe.

By placing a jet aspirator 52 Figure 2, at a proper point of low pressure in the inlet duct, suitable mixing of the liquid fuel and air will take place by well known carburetion action.

For proper operation of the engine phase coordination of the pistons' motion with respect to each other will be required. In the ordinary free-piston engine this phase coordination is usually effected by rack and pinion linkages physically connecting the two pistons together. In the present engine such linkages are not required. Automatic phase compensation will be obtained partly by the vents 80 and 81 in the annular bounce cylinders 78—79 and partly by virtue of the electrical interconnection of the coils 13—14—15—16 which tend to keep the velocities and displacements of pistons 11 and 12 alike. Since these pistons are connected by a common stiffness in the compressed gas in the combustion chamber 40, any change in the velocity of one of the pistons will be compensated for by a similar change in the velocity of the other, through the coupling of this gas column and the electrical generators 13—14—21 and 15—16—22 connected in parallel, or in series through the load. This coupling through the electrical generator connection exists by virtue of the reversible nature of these generators, which serve equally well as motors if supplied with electrical current of the proper frequency. Hence, if the velocity of one annular piston tends to exceed that of the other, the first piston acting as a generator will tend to drive the second acting as a motor at the first's higher velocity and vice versa.

Other objects and characteristics of the invention will become apparent upon further study of the invention as exemplified in the embodiment thereof that is illustrated in the accompanying drawings, wherein:

Figure 2 is a schematic representation of electrical connections and auxiliary devices applicable to the engine of Figure 1, Figure 3 shows the thermodynamic cycle employed.

Figure 4 shows a longitudinal sectional view of a modification of the free piston engine disclosed in Figure 1 and Figure 5 is a cross section of a modification of the device of Figure 4 taken along the line illustrated at 5—5 of Figure 4.

Figure 1:
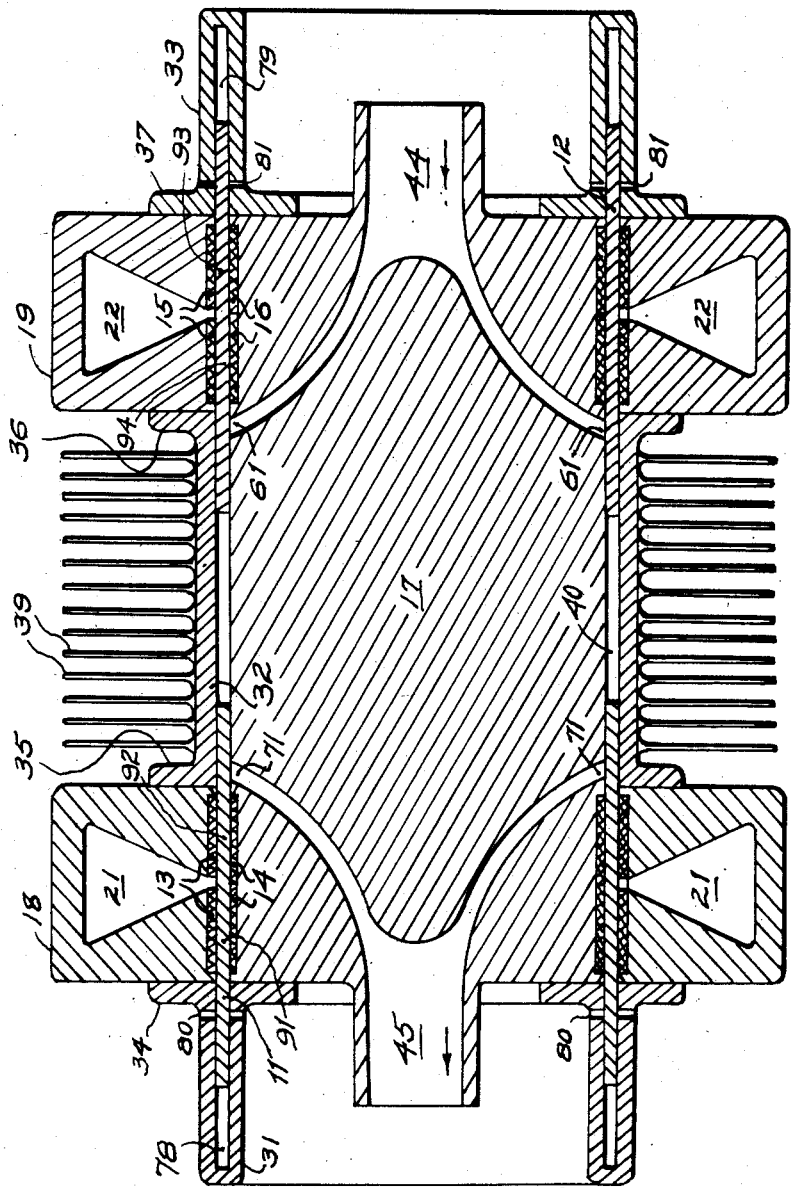
Figure 1 is a longitudinal sectional view of a free piston engine suitable for practice of the invention.

Referring first to Figure 1, the engine there illustrated comprises two thin-walled electrically conducting annular pistons, 11—12 axially aligned for high frequency rectilinear vibration within the fixed radial electromagnetic fields in the gaps 91—92—93—94 established by coils 21—22 or by an equivalent permanent magnet structure, causing interaction between the respective electrically conductive pistons and current generating coils 13—14—15 and 16, wound concentrically at opposite ends of a solid cylindrical core 17, which core is surrounded by magnetically conducting end rings 18—19, recessed to receive the said coils 13—14—15 and 16 as well as supplementary coils 21 and 22 which produce the polarizing flux in the gaps 91—92—93—94. Coils 13—14—15 and 16 operate in conjunction with the rapidly vibrating piston-inductor elements 11 and 12 as the means for the A.C. current generations, since the flow of the magnetic lines of force coursing through the conductive pistons, radially, is cut by the pistons moving first in one direction and then in the other, thus generating in the annular pistons an alternating current for delivery by induction to the output circuit formed by conductors 26 and 27 attached to the terminals of the coils 13—14 and 15—16 respectively.

To hold rings 18 and 19 in fixed relationship to core 17 and at the same time provide retention means for the vibrating piston-inductors 11 and 12, three retainer elements 31—32—33 are provided, with the elements 31 and 32 having mating flanges 34 and 35 flanking the ring 18 and secured thereto by bolts (not shown), and the elements 32 and 33 having similar flanges 36 and 37 secured to ring 19 in corresponding fashion. Central retainer element 32 is finned, as indicated at 39, to facilitate temperature control, and its inner surface forms the outer cylindrical wall of the annular combustion chamber 40 whose inner wall is constituted by the periphery of core 17.

The ends of the core 17 are extended to form passages 44 and 45 for the intake and exhaust, respectively, of a combustible mixture of hydrocarbon fuel and air, which mixture is formed in intake conduit 46, Figure 2 by the aspiration of fuel reaching said conduit from supply tank 47 under the control of a valve 48 which is biased towards the open position by a spring 49, but adapted to be closed by the pull of a solenoid 50 deriving its energizing current from generator output circuits 26 and 27. So long as the output voltage in lines 26 and 27 remains at a constant value, as it will, so long as the vibratory velocity of pistons 11 and 12 remains constant, the pull of solenoid 50 will be constant and sufficient to hold valve 48 closed the required amount against the opposing force of spring 49, tending to open it fully. The solenoid 50 being operated by alternating current, will of course, be equipped with a suitable shorted turn on part of the plunger 51 so that it will experience a steady pull in the usual manner for A.C. plunger type solenoids. If desired load current may be used by methods well known in the art but not shown to adjust the fuel valve with or without voltage control as described.

The resonant intake duct 46 of suitable length $L_1$, by virtue of longitudinal acoustic resonance will insure that the pressure will exceed atmospheric outside the combustion chamber 40, Figure 1, cyclically, just as input parts 61 open, thus providing an adequate inrush of fuel air mixture to chamber 40. The combustible mixture is delivered intermittently, that is upon each uncovering of the ports 61 by the retreat of piston 12 to its extreme right hand position. The fuel is delivered into the input 46 through valve 48 by aspiration into a low pressure node in 46. It is to be understood that such successive retreats of piston 12 occur in response to the successive explosions of the combustible mixture in chamber 40. These successive explosions occur as the converging pistons 11 and 12 compress the admitted mixture between them until the self-igniting temperature is reached. By a suitable control of the fuel admitted per stroke, vibratory resonance is established at the prescribed amplitude and frequency, pistons 11 and 12 being the masses and gas columns in 78 and 79, and combustion chamber 40 being the non-linear stiffnesses, giving the required output frequency, which may be for instance, sixty cycles per second. It will be clear that with a vibratory system of this type in which the stiffness element is non-linear, that is to say, in which the restoring force is not proportional to the displacement, the frequency of vibration will be dependent upon the amplitude of vibration, among other things.

In the present engine this parameter, namely, amplitude, is fixed by the opening of bounce-cylinder ports 80 and 81 at one end of the stroke and by the considerations of maximum peak pressure between pistons 11 and 12 in chamber 40, due to their kinetic energy as heretofore described and at the other end of the stroke by the opening of exhaust port 71 and intake port 61 and similar peak pressure considerations in bounce-cylinders 78 and 79.

As heretofore noted, the ignition point may vary from stroke to stroke, as temperature and pressure fluctuate somewhat about the average values, however, the energy storage capacity of the moving parts (equivalent to the power developed by twenty or more explosions) assures constancy of power exchange from stroke to stroke, notwithstanding such variations in the ignition point.

As intake ports 61 (of which there may be more than the two shown, if desired), so that the total area of intake port is at least equal to the annular cross-sectional area of combustion chamber 40 are uncovered, the exhaust ports 71 are also uncovered to permit discharge of the burnt products of combustion as the new charge is entering the combustion chamber. The total area of exhaust ports 71 may likewise equal the annular cross-sectional area of combustion chamber 40 for best scavenging action. If desired, the ports 71 may "lead" the ports 61 slightly to provide a time differential between exhaust and intake, in accordance with the formula developed in the Kadenacy patents, of which Patent No. 2,144,065 is illustrative. To expedite the exhaust action, a resonant exhaust duct 77 may be used, of suitable length $L_2$, as suggested in Figure 2, so that the outside pressure will periodically drop below atmospheric at the instant of opening of the exhaust ports 71. The length of this duct includes the passage 45 up to the ports 71.

As the pistons 11 and 12 moved outward, they compress air in the annular pockets 78, 79, which compressed air serves as a restoring force to return the pistons to their inner or firing positions. In order that this may be accomplished without loss, the whole operation is made adiabetic and reversible, by suitable heat insulation on annular chambers 31 and 33 to prevent the escape of the heat of adiabatic compression.

Vents 80 and 81 contribute to the functioning of pockets 78 and 79 supplying a fresh charge of air each stroke to compensate for any leakage. They serve also as phase compensating means and as amplitude-limiting means to keep the pistons 11 and 12 in phase equality and at the chosen frequency of vibration as heretofore described.

Pistons 11 and 12 are equipped with suitable piston rings (not shown) on their inner and outer peripheries at suitable points to permit pressure generation in combustion chamber 40 and bounce-cylinders 78, 79, in the usual manner.

Circumferential expansion of the annular pistons 11 and 12 due to the heat of combustion (which due to the low maximum temperature of the engine and the high thermal efficiency, is small as compared with the usual engine) is partly compensated for by the movement allowed radially by these piston rings in their grooves, and partly by the choice of materials for outer cylinder 32, inner core 17 and bounce-chambers 31 and 33 having the same coefficient of expansion as pistons 11 and 12. Sufficient clearance should exist in gaps 91, 92, 93 and 94 to accommodate such expansion without pistons 11 and 12 striking coils 13, 14, 15 and 16. For purposes of heat expansion, bounce-chambers 31 and 33 are so mounted to magnetic members 18 and 19 as to remain centered with respect to the longitudinal axis of the engine, and so as to prevent longitudinal motion in either direction, but to allow free radial expansion and contraction as required to equal that of pistons 11 and 12. Due to the use of equal weight pistons in phase opposition, the engine is statically and dynamically balanced, and operates without vibration as a whole.

It is clear that all of the principles outlined above could be equally well utilized in a free piston engine with solid injection of fuel or air spray injection at the latter part of the stroke, air only being compressed in the chamber 40 as in the diesel engine. Whereas the compression and ignition of a fuel-air mixture is preferred, the concept broadly includes all forms of fuel injection and the advantages of random timing as described are still retained.

The invention may be practiced in embodiments differing from that illustrated, and the disclosed principles may be utilized separately as well as in the disclosed or any equivalent combination, also the inter-relationships and inter-action of parts may vary from those illustrated to the extent permitted by the scope of the appended claims.

It is well known that the annular fields may be produced by permanent magnets. When such permanent magnets are used, it is important to keep the radial length of the gap short in order to be able to use a minimum amount of permanent magnet material. The single turn inductors with their surrounding windings as described above can be replaced with a multi-turn piston winding as illustrated in Figure 4. In this modification the currents are induced directly into these moving turns instead of into the single shorted turn and thence by induction into the output windings. This expedient reduces copper losses and is also more economical as a result of reduction of the size of the permanent magnet required, providing a structure in which a shorter radial gap may be used, at the same time maintaining equivalent power output.

Since no shorted turn is used the electrical Q of the winding may be made higher which is an important consideration particularly at the lower frequencies.

In order to use a multi-turn winding, it is necessary to wind one half of each piston winding clockwise for instance and the other half counter-clockwise as the respective halves of the piston winding vibrate in magnetic fields which are opposite in radial direction. Current is taken from the windings of the multi-turn piston windings by insulating the respective bounce chambers on either end of the engine, and by using the piston rings as electrical slip rings to conduct the current generated in the moving coils to the bounce chambers. A suitable power cable may be connected to these chambers for taking the current from them. The piston rings on the inner ends of the pistons serve as electrical slip rings also and complete a return from the coils through the frame of the machine as the inner piston rings are grounded directly to the frame and structure of the machine.

The two halves of each coil wound in opposite directions are connected in series, the two complete piston coils each comprising the two oppositely wound halves in series may be connected in parallel in order to effect phase control between the individual pistons as described previously. Referring specifically to Figure 4 there is illustrated an inner frame 100 having axially aligned intake opening 101 and exhaust opening 102. Interposed between the openings 101 and 102 is a gas directing baffle 103 having walls 104 and 105 cooperating with the facing walls 106 and 107 of the openings 101 and 102 respectively to suitably direct the inflow and exhaust of gas to and from the combustion chamber through ports 109 and 110. Each end of the frame has secured to it a cap 112 suitably mounted as for example by annular shoulder and recess means 113, 114 and 115. Gasket 116 may, if desired, be interposed between these shoulder members to suitably seal the engine. A baffle member 118 is positioned within each cap and is suitably supported therein by spider elements 119. This baffle element 118 is coaxially aligned with the openings 101 and 102 respectively. The baffle is provided with a surface adapted to cooperate with the inner wall 120 of the cap to direct the flow of the gas inwardly or outwardly. The opening 121 formed by this baffle and inner wall 120 is annular. If desired as illustrated in Figure 5, the opening 121 need not be annular but may be a series of tube like passages. The essential criterion here is to preferably make the passage or passages 121 equal in cross sectional area to the passage 101 or as the case may be 102. It is also preferable to make the passage 101 equal in total cross sectional area to half the cross sectional area of combustion chamber 124. A second set of inlet and outlet passages 126 and 127 are provided. The inlet passages 126 extend longitudinally and preferably parallel to the passage or opening 101 and are positioned preferably radially about the frame outside of the piston. The inner ends of the passages 126 open into the ports 128 which are parallel to and aligned with the openings 109, these ports 128 being positioned on the opposite side of the annular chamber walls 130 and 131. The other end of the opening 126 merges into a common admitting passage 132 together with the openings 121. The cross sectional area of the passages 126 should be equal in their total cross sectional area to half the cross sectional area of combustion chamber 124. The ports 128 may in turn be equal or somewhat less in cross sectional to one half the cross sectional area of the annular chamber 124. The ports 109 should, as indicated, be equal to or somewhat less than one half the cross sectional area of the chamber 124. The length of the opening 126 should be equal to the length of the opening 101 and 121 for preferred and best performance. The structure of the outlet end of this machine relative to the passages 127 to 102 is identical in design to that above described. The annular chamber 124 is formed by the inner wall 131 and outer wall 130 and encases the inner ends of the pistons 140 and 141. The pistons 140 and 141 are formed with inner and outer end masses 142 and 143 respectively, with a central tubular winding section 144. The end masses 142 and 143 are furnished with suitable piston rings which serve to seal the gas chambers and serve the additional function of providing an electrical conductivity means, with the piston rings on the inner mass 142 acting as means for conducting current from the coil section 144 through wire connections hereinafter described to the load. The coil section 144 is formed of closely coiled copper suitably bonded together and rigidly mounted in an annular form by means of glass or plastic binders capable of withstanding substantial temperature and pressure. This coil section 144 has the copper wire wound clockwise on one half and counter-clockwise on the other half with the two halves joined together at the center. The outer ends of the coil section are suitably mounted and secured mechanically and electrically in the end mass sections 142 and 143.

The inner end mass section 142 is slidably mounted in the annular chamber 124 and is adapted to move longitudinally therein. Positioned adjacent and outwardly of this chamber 124 is a permanent or electrical magnet 150 which is annular in shape. If an electrical magnet is utilized, coils 151 are provided to energize the magnet. A shoulder section 152 is formed in the frame to cooperate with the permanent annular magnet 150 to form a narrow gap between these two members. The coil section 144 is positioned within this gap 153 which is of annular shape. It will be observed that the flux from the permanent or electro-magnet 150 is radial in direction and is outward on one half of the magnet and inward on the other half of the magnet. As indicated above a uniform directional flow of current is obtained by reversing the coil winding in the coil section 144. This magnet 150 may be secured to the frame by suitable means such as bolt means 155 and may be provided with current if it is an electrical magnet through the line 156, which passes through the frame at 157. Beyond and outside of the permanent magnet 150 there is positioned a second annular chamber 158 formed by the angular inner wall 159 and outer wall 160. This chamber 158 may be termed a bounce chamber and contains the outer mass 143. The mass 143 is electrically and mechanically in contact with the walls 159 and 160 with suitable electrical contact being provided by the piston rings associated with the mass 143. The walls 159 and 160 are insulated from the frame by means of insulating gasket material 161 and 162 which suitably surround this bounce chamber and the walls forming it, providing electrical and thermal insulation to prevent grounding or heat loss. A line 165 passing through the frame at 157 and connected through the insulation to the outer wall 160 is used to conduct current from this outer bounce chamber. Suitable cooling fins 170 with insulating covering member 171 angular in cross section together with an air or water inlet section 172 may be provided for the purpose of circulating air or water and thereby maintaining the temperature of the engine at a satisfactory level.

As will be noted in the specific embodiment shown in Figure 4, the coil section 144 reciprocates with left and right amplitudes about its mean position each approximately equal to one half of the width of one of the pole faces. As a result the separation between adjacent pole faces is equal in width to the width of the pole faces themselves. A tube 173 is provided to compensate for leakage in the bounce chamber 158.

The description here given of the input end of the modification illustrated in Figure 4 is similar in structure and complementary in function to the exhaust end and the exhaust end structure may readily be understood from a consideration of the structure hereinabove described.

Having now described my invention, I claim:

1. The method of converting potential energy in the form of fuel to electrical energy in the form of dynamo-electric output, which comprises (1) burning the fuel in a confined space to create fluid pressure, and (2) controlling said burning in a manner to produce ignition of the fuel at varying positions in the cycle of the pressure actuated parts defining said space in accordance with the pressure developed and thereby provide free interchange of energy between the burning fuel and vibratory parts subjected to said pressure.

2. The method defined in claim 1, including the further step of causing said pressure-actuated parts to contribute to the generation of an alternating E.M.F. as they receive energy from said fuel.

3. The method of converting potential energy in the form of fuel to electric energy in the form of dynamo-electric output, which comprises (1) introducing a fuel-air mixture in to a confined space, (2) moving an electrically inductive element into said space to compress said mixture and thereby raise its temperature to the igniting point, and (3) repeating said steps periodically to produce ignition at variable degrees of compression of the varying fuel-air mixture, according to the amount of heat required.

4. The method defined in claim 3, included the further step of causing said electrically inductive element to contribute to the generation of an alternating E.M.F. as it moves in relation to said space.

5. In a prime mover dynamo plant, a pair of aligned annular inductor elements of small mass and large diameter in relation to wall thickness, current delivering windings surrounding said inductor elements, and means for introducing a fuel-air mixture into the annular space between the facing annular edges of said inductor elements for ignition by the compressing effect of said inductor elements as they move toward each other following each operation of said introducing means.

6. In a compression ignition, free piston engine, a pair of pistons of such mass and moving with such maximum velocity that the kinetic energy of the pistons at maximum velocity and the potential energy of the compressed gases between them at maximum pressure are each substantially twenty times, more or less, and the energy lost internally and extracted from the engine per radian period by the load, and a pair of inductor elements integrated with said pistons for converting said energy into electric power.

7. In a vibratory free piston compression ignition engine, a pair of opposed moving pistons, means for operating said pistons in such a manner that the frequency and amplitude of their vibratory motion is such that the ratio of the mass reactance of the pistons to the mechanical resistance to motion, which they encounter at full load, is of the order of twenty, more or less, and a pair of inductor elements integrated with said pistons for converting said energy into electric power.

8. In a free piston engine, a pair of opposed pistons and means for energizing said pistons in such a manner that $Q_L$, the ratio of mass reactance of the moving pistons to the mechanical resistance to motion which they encounter at full load is equal to $$Q_L = \frac{\pi}{2} \times \frac{(K-1)(r-1)}{\left(\frac{(1)}{(r)}\right)^{K-1}(1-B^K) + K(B-1)}$$

where $r$ is the compression ratio, $K$ is the ratio of the specific heats for constant pressure to constant volume, and $B$ the ratio of the absolute temperature of the gas after combustion but before expansion to the absolute temperature of the gas after compression but before combustion and a pair of inductor elements integrated with said pistons for converting said energy into electric power.

9. A free piston engine as in claim 8, wherein the ratio of the volume of the working fluid after combustion but before expansion to the volume after compression but before combustion is B, at full load where, $$K_B = \left(\frac{(2)}{(K-1)}\right)^{\frac{-K}{K-1}}$$

and K is the ratio of the specific heats for constant pressure to constant volume for the exhaust gas at the instant of the opening of the exhaust ports.

10. A free piston engine as in claim 8 in which the ratio of the absolute temperature of the working fluid after combustion but before expansion to the absolute temperature before combustion but after compression is B, at full load where $$B^K = \left(\frac{(G)}{(K+1)}\right)^{\frac{-K}{K-1}}$$

11. A free piston engine as defined in claim 8, in which the mass of each moving piston in grams is M, where $$M = \frac{R}{4f} \times \frac{(K-1)(r-1)}{\left(\frac{(1)}{(r)}\right)^{K-1}(1-B^K) + K(B-1)}$$

R is the resistance in mechanical ohms opposing the motion of the piston, $f$, the frequency of vibration in cycles per second, $r$ the compression ratio, B the cut-off ratio at full load adjusted by controlling the fuel admitted per stroke and K the ratio of specific heats at constant pressure and volume for the fluid used.

12. A free piston engine as in claim 11, where the cut-off ratio B at full load is determined by the formula, $$B^K = \left(\frac{(2)}{(K+1)}\right)^{\frac{-K}{K-1}}$$

13. A free piston engine as defined in claim 8 in which the mass of the moving pistons, their areas, velocities and amplitude of vibration are so chosen that, at maximum compression due to inertial effects alone, the peak pressure developed in the combustion chamber is numerically equal to the absolute ambient pressure times the factor $(r)^K$, where $r$ is the compression ratio and K is the ratio of the specific heat for constant pressure to that for constant volume for the fluid used.

14. A free piston engine as in claim 11, in which the mean effective pressure at full load is made to be $$\frac{\pi}{20_L}$$

times the peak pressure by adjusting the amount of fuel admitted per stroke, where $Q_L$ is the ratio of mass reactance of the moving pistons to the mechanical resistance to motion which they encounter and is related to the compression ratio by the formula $$Q_L = \frac{\pi}{2} \times \frac{(K-1)(r-1)}{\frac{1^{(K-1)}}{r} \times (1-B^K) + K(B-1)}$$

where $r$ is the compression ratio, K is the ratio of the specific heats for constant pressure to constant volume, and B is the ratio of the absolute temperature of the gas after combustion but before expansion to the absolute temperature of the gas after compression but before combustion.

15. In a free piston, compression ignition engine, using resonant input and exhaust ducts for scavenging, means for controlling the fuel input per stroke so that the exhaust pressure is substantially maintained at the value that produces maximum velocity of fluid exhaust at full load, said means including exhaust ports located to provide the desired frequency of vibration when the cut-off ratio B is fixed at $$B^K = \left(\frac{2}{(K+1)}\right)^{\frac{-(K)}{(K-1)}}$$

where K is the ratio of specific heats for constant pressure and volume for the fluid used at the instant of exhaust port opening.

16. In a free piston ignition engine having resonant intake and exhaust ducts, the combination with said ducts of means for exciting said ducts to resonance when the exhaust pressure reaches the value corresponding to maximum exhaust velocity, said means comprising exhaust ports located to provide the same frequency of vibration in said ducts as in the moving parts of said engine, and to provide an exhaust pressure at the instant of exhaust port opening corresponding substantially to $$P_D = P_0 B^K$$

where $P_0$ is ambient pressure absolute and K is the ratio of specific heats for constant pressure and volume for the fluid used.

17. A power plant of the free piston internal combustion longitudinal induction generator type, with compression ignition of a fuel-air mixture introduced into the annular area between the aligned edges of free-running pistons, before compression begins, which pistons are of a mass just sufficient to have, at their maximum velocity, kinetic energy storage twenty times, more or less, the energy lost internally and extracted from the electrical generator per radian period at full load, said pistons being of annular form and made of electrically conducting material to permit their serving the additional function as single turn moving inductors in the vibratory longitudinal induction-type generator, which is the electrical power source.

18. A power plant of the free piston internal combustion longitudinal induction generator type, with compression ignition of fuel injected under pressure at the completion of the compression stroke into the annular area between the aligned edges of free-running pistons, which pistons are of a mass just sufficient to have, at their maximum velocity, kinetic energy storage twenty times, more or less, the energy lost internally and extracted from the electric generator per radian period at full load, said pistons being of annular form and functioning as single-turn inductors constituting part of said electrical generator.

19. An energy converter comprising a pair of opposed vibratory pistons each forming at least in part an electrical conductor, means forming magnetic fields through which the conductors may be moved, means including said pistons forming an enclosed space, means for periodically supplying heat to a gas in said enclosed space so that the expanding gas moves the pistons and thereby moves the conductors through the magnetic field and converts part of the internal energy in the gas into electric energy in the conductors.

20. An energy converter comprising a vibratory piston forming at least in part an electrical conductor, means forming a magnetic field through which the conductor may be moved, means including said piston forming an enclosed space, means for periodically supplying heat to a gas in said enclosed space so that the expanding gas moves the piston and thereby moves the conductor through the magnetic field and converts part of the internal energy in the gas into electric energy in the conductor.

21. In a free piston electrical generator, at least one piston forming in part an electrical conductor, means forming a magnetic field within which said conductor may be moved, means including said piston forming an enclosed space, and a piston ring means mounted on said piston and electrically connected to said conductor for gas sealing said enclosed space and providing electrical conductivity means to an external load for current induced in said conductor.

22. In a free piston electrical generator, means forming a magnetic field, at least one piston arranged to be reciprocated with respect to said field, said piston comprising at least in part an electrically inductive conductor.

23. A device as set forth in claim 22 wherein said piston is annular in cross section.

24. A device as set forth in claim 23 wherein said piston is formed with mass members integrally formed with said conductor at either end thereof.

25. A device as set forth in claim 23 further providing coil means integral with said piston in which currents may be induced on movement of said piston.

26. In a free piston electrical generator, annular means forming a radial magnetic field, at least one piston arranged to be reciprocated with respect to said field, said piston comprising at least in part an electrical conductor annular in cross section with annular mass members integrally formed with said conductor at either end thereof.

27. In a free piston electrical generator, means forming an annular combustion chamber, annular piston means positioned and moveable within said chamber, means forming radially disposed ports on the inner and outer wall of said chamber adapted to be opened and closed by movement of said piston means, and a plurality of passages connecting said ports with a common gas conducting passage, said passages being of substantially equal length and having a total cross sectional area substantially equal to the total cross sectional area of said chamber.

References Cited in the file of this patent

UNITED STATES PATENTS

| | | |
|---|---|---|
| 1,785,643 | Noack et al. | Dec. 16, 1930 |
| 1,802,848 | Summers | Apr. 28, 1931 |
| 2,102,559 | Kadenacy | Dec. 14, 1937 |
| 2,144,065 | Kadenacy | Jan. 17, 1939 |
| 2,362,151 | Ostenberg | Nov. 7, 1944 |
| 2,595,932 | Eichelberg | May 6, 1952 |